United States Patent
Yaguchi

(10) Patent No.: US 12,438,448 B2
(45) Date of Patent: Oct. 7, 2025

(54) SWITCHING CONTROL CIRCUIT AND POWER SUPPLY CIRCUIT

(71) Applicant: FUJI ELECTRIC CO., LTD., Kawasaki (JP)

(72) Inventor: Yukihiro Yaguchi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 275 days.

(21) Appl. No.: 18/357,545

(22) Filed: Jul. 24, 2023

(65) Prior Publication Data

US 2024/0072661 A1   Feb. 29, 2024

(30) Foreign Application Priority Data

Aug. 25, 2022 (JP) ................................ 2022-134343

(51) Int. Cl.
H02M 1/42 (2007.01)
H02M 1/00 (2006.01)

(52) U.S. Cl.
CPC ....... H02M 1/4225 (2013.01); H02M 1/0009 (2021.05); H02M 1/0025 (2021.05); H02M 1/4216 (2013.01); H02M 1/0032 (2021.05)

(58) Field of Classification Search
CPC . H02M 1/0009; H02M 1/0032; H02M 1/4225
See application file for complete search history.

(56) References Cited

U.S. PATENT DOCUMENTS

| | | | |
|---|---|---|---|
| 2005/0237037 A1* | 10/2005 | Xing | H02M 3/156 323/268 |
| 2006/0208789 A1 | 9/2006 | Shimada | |
| 2011/0305043 A1 | 12/2011 | Matsumoto | |
| 2015/0061615 A1* | 3/2015 | Michishita | H02M 3/1588 323/271 |
| 2023/0387805 A1* | 11/2023 | Akaho | H02M 1/0009 |
| 2024/0333132 A1* | 10/2024 | Yamada | H02M 7/21 |

FOREIGN PATENT DOCUMENTS

| | | |
|---|---|---|
| JP | 2006-262548 A | 9/2006 |
| JP | 2011-259673 A | 12/2011 |

* cited by examiner

Primary Examiner — Jue Zhang
Assistant Examiner — Lakaisha Jackson
(74) Attorney, Agent, or Firm — Rabin & Berdo, P.C.

(57) ABSTRACT

A switching control circuit for a power supply circuit that includes an inductor to which a voltage in accordance with an alternating current (AC) voltage is applied, and a transistor controlling an inductor current flowing through the inductor, the power supply circuit generating an output voltage from the AC voltage, the switching control circuit being configured to control switching of the transistor, the switching control circuit comprising: an ON signal output circuit that outputs an ON signal to turn on the transistor in response to the inductor current reaches a predetermined current, when a feedback voltage in accordance with the output voltage indicates that the output voltage is lower than a first level, and outputs the ON signal every first cycle when the feedback voltage indicates that the output voltage is higher than the first level; an OFF signal output circuit that outputs an OFF signal to turn off the transistor based on the feedback voltage; and a driver circuit that drives the transistor based on the ON signal and the OFF signal, wherein the first cycle is longer than a second cycle, which is a cycle of the ON signal when the output voltage is lower than the first level.

8 Claims, 8 Drawing Sheets

| MODE | Vfb (Vout) | OPERATION CIRCUIT | Vzcd | TIME PERIOD T | SWITCHING CYCLE |
|---|---|---|---|---|---|
| CRITICAL | <Vref1 (<V1) | FREQUENCY REDUCTION CIRCUIT 102 | MAY BE Vzcd > Vthh WHEN OSCILLATION | >Ta | NO BOTTOM SKIP |
| BOTTOM SKIP | <Vref1 (<V1) | FREQUENCY REDUCTION CIRCUIT 102 | MAY BE Vzcd > Vthh WHEN OSCILLATION | <Ta | WITH BOTTOM SKIP |
| BOTTOM-NON-DETECTION | <Vref1 (<V1) | FREQUENCY REDUCTION CIRCUIT 102 | — | — | TURN ON AFTER Trst0 HAS ELAPSED SINCE Vzcd < Vthl |
| FIXED FREQUENCY | >Vref1 (>V1) | RESTART TIMER 103 | — | — | FIXED (=Trst1) |

FIG. 4

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2022-134343 filed on Aug. 25, 2022, the entire disclosure of which is hereby incorporated by reference herein.

BACKGROUND

Technical Field

The present disclosure relates to a switching control circuit and a power supply circuit.

Description of the Related Art

In general, a power factor correction circuit that outputs a DC voltage from an AC voltage to a load is provided with a switching control circuit that controls a switching device (for example, see Japanese Patent Application Publication Nos. 2006-262548 and 2011-259673).

In general, such a switching control circuit shortens an ON time period of the switching device when the load is in a light load state.

Additionally, for example, if the ON time period is shortened when the power factor correction circuit operates in a critical mode, an OFF time period may also be shortened, and a switching frequency of the switching device may be increased. In this case, a problem of heating of the switching device may occur.

SUMMARY

A first aspect of an embodiment of the present disclosure is to provide a switching control circuit for a power supply circuit that includes an inductor to which a voltage in accordance with an alternating current (AC) voltage is applied, and a transistor controlling an inductor current flowing through the inductor, the power supply circuit generating an output voltage from the AC voltage, the switching control circuit being configured to control switching of the transistor, the switching control circuit comprising: an ON signal output circuit that outputs an ON signal to turn on the transistor in response to the inductor current reaches a predetermined current, when a feedback voltage in accordance with the output voltage indicates that the output voltage is lower than a first level, and outputs the ON signal every first cycle when the feedback voltage indicates that the output voltage is higher than the first level; an OFF signal output circuit that outputs an OFF signal to turn off the transistor based on the feedback voltage; and a driver circuit that drives the transistor based on the ON signal and the OFF signal, wherein the first cycle is longer than a second cycle, which is a cycle of the ON signal when the output voltage is lower than the first level.

A second aspect of an embodiment of the present disclosure is to provide a power supply circuit that generates an output voltage from an alternating current (AC) voltage, the power supply circuit comprising: an inductor to which a voltage in accordance with the AC voltage is applied; a transistor that controls an inductor current flowing through the inductor; and a switching control circuit that controls switching of the transistor, wherein the switching control circuit includes an ON signal output circuit that outputs an ON signal to turn on the transistor in response to the inductor current being greater than a predetermined current when a feedback voltage in accordance with the output voltage indicates that the output voltage is lower than a first level, and outputs the ON signal every first cycle when the feedback voltage indicates that the output voltage is higher than the first level; an OFF signal output circuit that outputs an OFF signal to turn off the transistor based on the feedback voltage; and a driver circuit that drives the transistor based on the ON signal and the OFF signal, wherein the first cycle is longer than a second cycle, which is a cycle of the ON signal when the output voltage is lower than the first level.

BRIEF DESCRIPTION OF THE DRAWINGS

FIG. 4 is a diagram describing an operation mode of the power factor correction IC 29.

DETAILED DESCRIPTION

Hereinafter, the present disclosure will be described through embodiments of the disclosure. However, the following embodiments do not limit the disclosure according to the scope of the claims. In addition, not all the combinations of the features described in the embodiments are necessarily essential for solution in the disclosure.

Herein, when the term "couple" is used, it means to "electrically couple" unless otherwise noted. Herein, a state where the logic level of a voltage or a signal is a high (High) level will be referred to as "high or high level", and a state where the logic level is a low (Low) level will be referred to as "low or low level".

Figure 1:
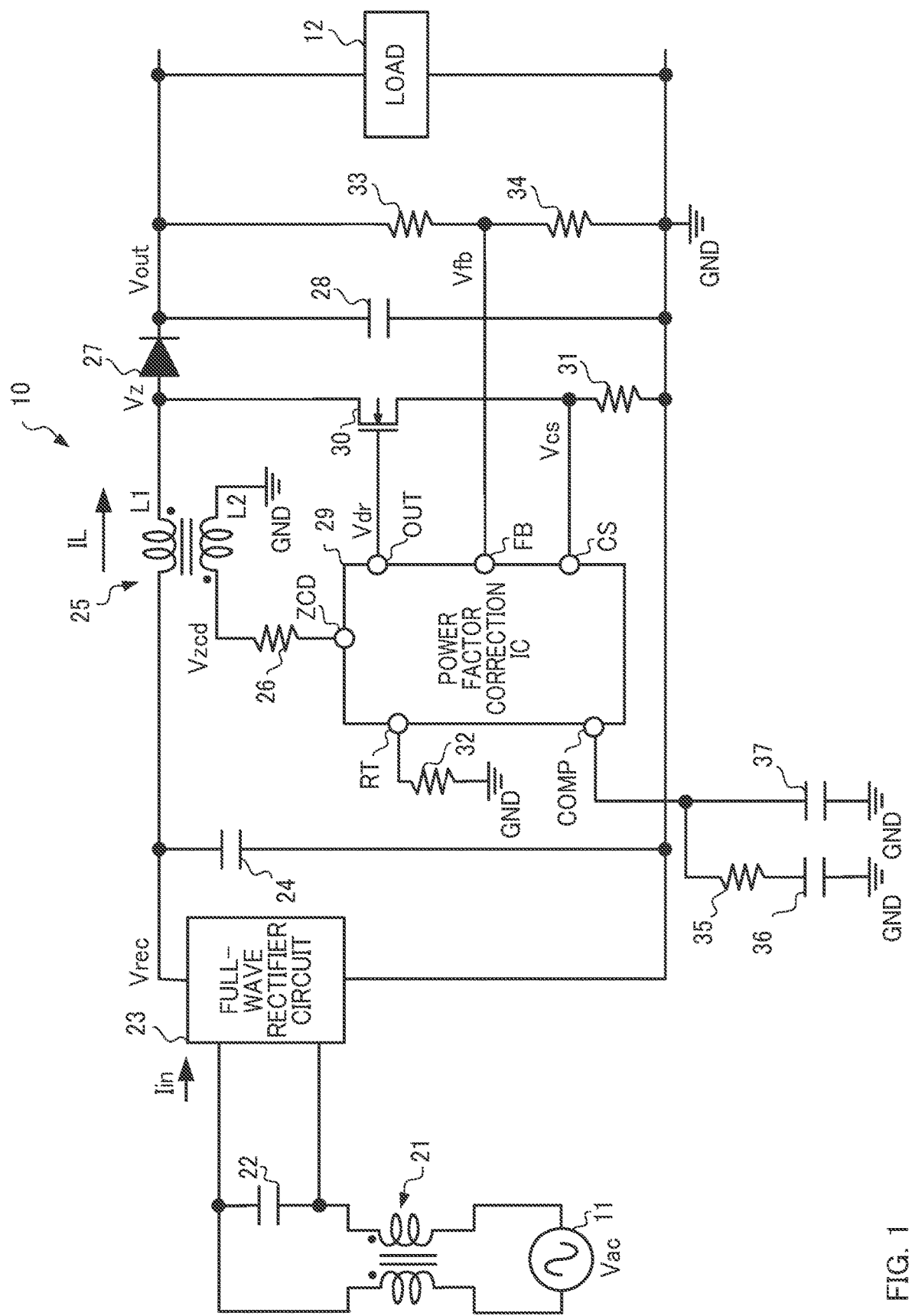
FIG. 1 is a diagram illustrating an example of a configuration of an AC-DC converter 10.

FIG. 1 illustrates an example of a configuration of an AC-DC converter 10. The AC-DC converter 10 is a boost chopper type power supply circuit that generates an output voltage Vout at a target level from an AC voltage Vac of an AC power supply 11. The AC-DC converter 10 applies the output voltage Vout to a load 12.

The AC power supply 11 herein is a commercial AC power supply that applies the AC voltage Vac to the AC-DC converter 10. The AC voltage Vac is a voltage of 100 to 277 V having a frequency of 50 to 60 Hz, for example. Additionally, the load 12 is an electronic device that operates with a DC-DC converter and/or a DC voltage, for example.

<<Configuration of AC-DC Converter 10>>

The AC-DC converter 10 includes a choke coil 21, capacitors 22, 24, 28, 36, and 37, a full-wave rectifier circuit 23, a transformer 25, resistors 26 and 31 to 35, a diode 27, a power factor correction IC 29, and a MOS transistor 30.

==Input to Full-Wave Rectifier Circuit 23==

The choke coil 21 and the capacitor 22 remove noise from the voltage Vac and a current supplied from the AC power supply 11 to the full-wave rectifier circuit 23. The voltage obtained by removing noise from the voltage Vac and an input current Iin are supplied from the AC power supply 11 to the full-wave rectifier circuit 23 through the choke coil 21 and capacitor 22.

==Configuration from Full-Wave Rectifier Circuit 23 to Load 12==

The full-wave rectifier circuit 23 full-wave rectifies the predetermined AC voltage Vac from which noise is removed and applies the full-wave rectified voltage as a rectified voltage Vrec to the capacitor 24 and a main coil L1 of the transformer 25.

The capacitor 24 smooths the rectified voltage Vrec applied by the full-wave rectifier circuit 23.

The transformer 25 includes the main coil L1 and an auxiliary coil L2 magnetically coupled to the main coil L1. Note that, the auxiliary coil L2 in the present embodiment is formed by winding such that a polarity of a voltage generated in the auxiliary coil L2 is a reverse polarity of a voltage generated in the main coil L1.

The auxiliary coil L2 is coupled to a terminal ZCD of the power factor correction IC 29 (described later) through the resistor 26. A current which is determined in accordance with an inductor current IL flowing through the main coil L1 flows through the auxiliary coil L2, and thus a voltage Vzcd which is determined in accordance with the inductor current IL is applied to the terminal ZCD.

The main coil L1 of the transformer 25 forms a boost chopper circuit together with the diode 27 and the capacitor 28. This boosts a charge voltage of the capacitor 28 to the DC output voltage Vout, and the DC output voltage Vout is supplied to the load 12.

The power factor correction IC 29 is an integrated circuit that controls switching of the MOS transistor 30 such that the level of the output voltage Vout reaches the target level (for example, 400 V) while improving the power factor of the AC-DC converter 10. The power factor correction IC 29 drives the MOS transistor 30 based on the inductor current IL flowing through the main coil L1 and the output voltage Vout.

The power factor correction IC 29 includes terminals CS, COMP, FB, RT, OUT, and ZCD. Note that, the power factor correction IC 29 includes a terminal other than the terminals CS, COMP, FB, RT, OUT, and ZCD (for example, a power supply terminal, a GND terminal, and the like); however, the other terminals are omitted in FIG. 1.

The MOS transistor 30 is a power transistor that controls electric power to the load 12 of the AC-DC converter 10. Specifically, the MOS transistor 30 controls the inductor current IL flowing through the main coil L1 of the transformer 25.

The MOS transistor 30 of the present embodiment is an N-type metal oxide semiconductor (MOS) transistor; however, it is not limited thereto. That is, any transistor can be applied at least the MOS transistor 30 is a transistor that can control the electric power, and a bipolar transistor may be applicable, for example. Here, a gate electrode of the MOS transistor 30 is coupled to the terminal OUT of the power factor correction IC 29.

As described later in detail with reference to FIG. 2, a voltage Vdr is applied from the power factor correction IC 29 to the gate electrode of the MOS transistor 30. The power factor correction IC 29 controls the electric power to the load 12 by controlling a timing to change a voltage level of the voltage Vdr.

The resistor 31 generates a voltage Vcs which is determined in accordance with a drain-source current of the MOS transistor 30. The drain-source current of the MOS transistor 30 is changed in accordance with the inductor current IL; for this reason, it is possible to detect the inductor current IL by detecting the voltage Vcs generated in the resistor 31. In the resistor 31, one end is coupled to a source electrode of the MOS transistor 30, and the other end is grounded. The voltage Vcs generated in the two ends of the resistor 31 is applied to the terminal CS.

The resistor 32 is a resistor that adjusts an oscillation frequency of an oscillator circuit (OSC) 111 (described later with reference to FIG. 2). The resistor 32 is coupled to the terminal RT, and the oscillation frequency is adjusted in accordance with a resistance value of the resistor 32.

The resistors 33 and 34 form a voltage divider circuit and, in accordance with the output voltage Vout, generate a feedback voltage Vfb used when switching the MOS transistor 30. The voltage divider circuit applies the divided voltage Vfb to the terminal FB of the power factor correction IC 29 as a feedback voltage.

The resistor 35 and the capacitors 36 and 37 are elements for phase compensation that are used in feedback control. The resistor 35 and the capacitor 36 are provided in series between the terminal COMP and the ground. Additionally, the capacitor 37 is provided in parallel to the resistor 35 and the capacitor 36.

==Configuration of Power Factor Correction IC 29==

Figure 2:
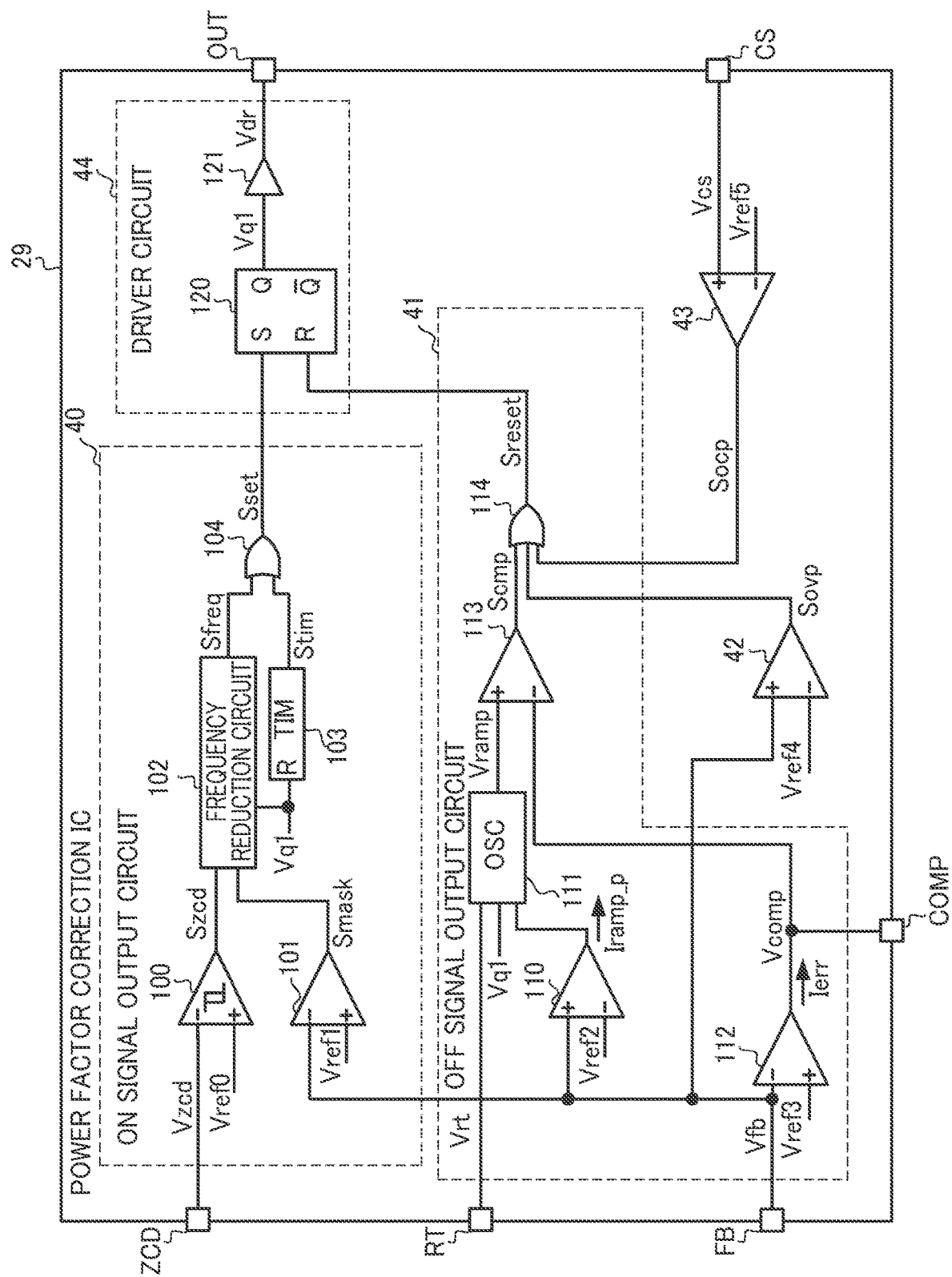
FIG. 2 is a diagram illustrating an example of a configuration of a power factor correction IC 29.

FIG. 2 illustrates an example of a configuration of the power factor correction IC 29. The power factor correction IC 29 includes an ON signal output circuit 40, an OFF signal output circuit 41, comparator circuits 42 and 43, and a driver circuit 44. Note that, the power factor correction IC 29 corresponds to a "switching control circuit".

The ON signal output circuit 40 outputs an ON signal Sset turning on the MOS transistor 30.

When the output voltage Vout is lower than a predetermined level V1, the ON signal output circuit 40 outputs the ON signal Sset turning on the MOS transistor 30 once the inductor current IL reaches "0". This will be described later in detail.

Here, "0" (zero) indicates "substantially zero", and "substantially zero" is hereinafter simply referred to as "0" (zero) as needed. Note that, the predetermined level V1 corresponds to a "first level", and "0" corresponds to a "predetermined current".

Additionally, when the output voltage Vout is higher than the predetermined level V1, the ON signal output circuit 40 outputs the ON signal Sset at every cycle Trst1 (described later).

The ON signal output circuit 40 includes comparator circuits 100 and 101, a frequency reduction circuit 102, a restart timer 103, and an OR circuit 104.

The comparator circuit 100 detects whether the inductor current IL reaches "0" based on the voltage Vzcd applied to the terminal ZCD. Since the auxiliary coil L2 is electromagnetically coupled to the main coil L1, the voltage Vzcd applied to the terminal ZCD is a voltage which is determined in accordance with the inductor current IL flowing through the main coil. Additionally, the comparator circuit 100 detects oscillation of the inductor current IL after the MOS transistor 30 is turned off.

Specifically, the comparator circuit 100 is a hysteresis comparator having thresholds Vthl and Vthh. The comparator circuit 100 compares the voltage Vzcd with the threshold Vthl for a case where the inductor current IL indicates "0" and the threshold Vthh for a case where the inductor current IL is increased.

When the inductor current IL is reduced to "0", the comparator circuit 100 outputs a signal Szcd at an "H" level (hereinafter, referred to as high or high level) to the frequency reduction circuit 102. On the other hand, when the inductor current IL is increased, and the voltage Vzcd exceeds the threshold Vthh, the comparator circuit 100 outputs a signal Szcd at an "L" level (hereinafter, referred to as low or low level) to the frequency reduction circuit 102.

Additionally, the threshold Vthl is a lower threshold of the comparator circuit 100 in accordance with a reference voltage Vref0 applied to the comparator circuit 100. Moreover, likewise, the threshold Vthh is a higher threshold of the comparator circuit 100 in accordance with the reference voltage Vref0.

Furthermore, after the MOS transistor 30 is turned off and indicates "0", the inductor current IL sinusoidally oscillates due to resonance of an inductance of the transformer 25 and a parasitic capacitance of a circuit such as the MOS transistor 30. This allows the voltage Vzcd to also sinusoidally oscillate after the MOS transistor 30 is turned off and indicates the threshold Vthl.

The comparator circuit 100 of the present embodiment also performs comparison based on the threshold Vthh so as to detect the oscillation of the voltage Vzcd. Note that, the threshold voltage Vthl and the threshold Vthh are described later in detail with reference to FIGS. 5 and 6. Note that, the comparator circuit 100 corresponds to a "first detection circuit", and the signal Szcd corresponds to a "detection result".

The comparator circuit 101 detects whether the output voltage Vout is higher than the predetermined level V1 by detecting whether the feedback voltage Vfb is lower than a reference voltage Vref1 which is determined in accordance with the predetermined level V1. Specifically, once detecting that the feedback voltage Vfb is lower than the reference voltage Vref1, the comparator circuit 101 outputs a high signal Smask. On the other hand, once detecting that the feedback voltage Vfb is higher than the reference voltage Vref1, the error amplifier circuit 110 outputs a low signal Smask. Note that, the comparator circuit 101 corresponds to a "second detection circuit".

When the output voltage Vout is lower than the predetermined level V1, the frequency reduction circuit 102 outputs an ON signal Sfreq based on the signal Szcd of the comparator circuit 101. Specifically, when the feedback voltage Vfb is lower than the reference voltage Vref1, the frequency reduction circuit 102 outputs the ON signal Sfreq in any one of a critical mode, a bottom skip mode, or a bottom-non-detection mode after the inductor current IL reaches 0.

Additionally, when a time period T is longer than a time period Ta, the frequency reduction circuit 102 operates the AC-DC converter 10 in the so-called critical mode. This operation will be described later in detail. Moreover, when the time period T is shorter than the time period Ta, the frequency reduction circuit 102 operates the AC-DC converter in the so-called bottom skip mode. Note that, the time period T is a time period from when the MOS transistor 30 is turned on to when the MOS transistor 30 is turned off and the inductor current IL reaches "0".

When the AC-DC converter 10 operates in the critical mode, the load 12 is in a heavy load state in general, and when the AC-DC converter 10 operates in the bottom skip mode, the load 12 is in a light load state in general.

Note that, the "heavy load state" of the load 12 is a state where the current flowing through the load 12 is equal to or greater than a predetermined value (for example, 1.0 A). The "light load state" of the load 12 is a state where, for example, the current flowing through the load 12 is smaller than the predetermined value (for example, 1.0 A).

Additionally, in the operation in the critical mode, the frequency reduction circuit 102 outputs the ON signal Sfreq when the inductor current IL reaches "0". On the other hand, in the operation in the bottom skip mode, the frequency reduction circuit 102 outputs the ON signal Sfreq after the number of times that the inductor current IL reaches "0" reaches a predetermined number of times. Note that, the ON signal Sfreq corresponds to a "first ON signal", and the time period Ta corresponds to a "predetermined time period".

Note that, a specific operation of the frequency reduction circuit 102 in each mode will be described in detail with reference to FIGS. 5 to 7. Additionally, the frequency reduction circuit 102 corresponds to a "first output circuit".

When the frequency reduction circuit 102 does not output the ON signal Sfreq in a predetermined time period, the restart timer (TIM) 103 outputs an ON signal Stim at a predetermined cycle to suppress a decrease in the output voltage Vout. Specifically, when the output voltage Vout is higher than the predetermined level V1, the restart timer 103 outputs the ON signal Stim turning on the MOS transistor 30 as the ON signal Sset when the cycle Trst1 has elapsed since the ON signal Sset is outputted.

Note that, the restart timer 103 of the present embodiment also has an object to turn on the MOS transistor 30 at a fixed frequency to suppress heating of the MOS transistor 30 when the load 12 is transiently in the light load state.

Additionally, the cycle Trst1, which will be described later in details, is longer than a cycle of the ON signal Sfreq outputted by the frequency reduction circuit 102 based on the inductor current IL at a time when the output voltage Vout is lower than the predetermined level V1. Moreover, the "cycle of the ON signal Sfreq at a time when the output voltage Vout is lower than the predetermined level V1" is a cycle of the ON signal Sfreq immediately before the restart timer 103 starts to output the ON signal Stim in response to the frequency reduction circuit 102 that stops outputting the ON signal Sfreq.

Note that, the operation of the restart timer 103 will be described in detail with reference to FIG. 8. Additionally, the restart timer 103 corresponds to a "second output circuit", the cycle Trst1 corresponds to a "first cycle", and the ON signal Stim corresponds to a "second ON signal". Moreover, the cycle of the ON signal Sfreq at a time when the output voltage Vout is lower than the predetermined level V1 corresponds to a "second cycle".

The OR circuit 104 calculates a logical sum of the signals Sfreq and Stim and outputs the logical sum as the signal Sset turning on the MOS transistor 30 to the driver circuit 44 (described later).

The OFF signal output circuit 41 outputs an OFF signal Sreset turning off the MOS transistor 30 based on the feedback voltage Vfb. Specifically, when the output voltage Vout is higher than a predetermined level V2, which is equal to or greater than the predetermined level V1, the OFF signal output circuit 41 outputs the OFF signal Sreset based on the feedback voltage Vfb so as to shorten the ON time period of the MOS transistor 30. This will be described later in detail.

The OFF signal output circuit 41 includes error amplifier circuits 110 and 112, the oscillator circuit (OSC) 111, a comparator circuit 113, and an OR circuit 114.

The error amplifier circuit 110 is a transconductance amplifier. When the output voltage Vout is higher than the predetermined level V2, the error amplifier circuit 110 adjusts a predetermined slope of an oscillator voltage Vramp of the oscillator circuit 111 (described later) so as to shorten the ON time period of the MOS transistor 30.

Specifically, when the feedback voltage Vfb in accordance with the output voltage Vout is higher than the reference voltage Vref2, the error amplifier circuit 110 outputs a current Iramp_p to the oscillator circuit 111. On the other hand, when the feedback voltage Vfb is lower than the reference voltage Vref2, the error amplifier circuit 110 stops outputting the current Iramp_p.

Note that, in the present embodiment, the error amplifier circuit 110 is used to adjust the predetermined slope of the oscillator voltage Vramp; however, it is also possible to use a comparator circuit to compare the feedback voltage Vfb with the reference voltage Vref2. In this case, the oscillator circuit 111 (described later) adjusts the predetermined slope of the oscillator voltage Vramp based on the result of comparison by the comparator circuit. Additionally, the error amplifier circuit 110 corresponds to an "adjustment circuit", and the predetermined level V2 corresponds to a "second level".

When the MOS transistor 30 is turned on, the oscillator circuit (OSC) 111 outputs the oscillator voltage Vramp having a voltage level changing with the predetermined slope. Specifically, when the MOS transistor 30 is turned on (that is, when the signal Vq1 is high), the oscillator circuit 111 outputs the oscillator voltage Vramp. On the other hand, when the MOS transistor 30 is turned off (that is, when the signal Vq1 is low), the oscillator circuit 111 sets the oscillator voltage Vramp to a ground level.

Additionally, the oscillator circuit 111 changes the slope of the oscillator voltage Vramp in accordance with the current Iramp_p from the error amplifier circuit 110. Note that, the oscillator circuit 111 outputs the oscillator voltage Vramp having the oscillation frequency which is determined in accordance with a resistance value of the resistor 31 to the comparator circuit 113.

The error amplifier circuit 112 is a transconductance amplifier and outputs a current Ierr which is determined in accordance with a difference between the feedback voltage Vfb and a reference voltage Vref3. As a result, the capacitors 36 and 37 coupled to the terminal COMP are charged with the current Ierr. Here, the reference voltage Vref3 is a voltage determined in accordance with the output voltage Vout at the target level. Additionally, a voltage of the terminal COMP to which an output of the error amplifier circuit 112 is coupled is a voltage Vcomp.

The comparator circuit 113 compares the oscillator voltage Vramp outputted by the oscillator circuit 111 with the voltage Vcomp applied to the terminal COMP, and when the oscillator voltage Vramp reaches the voltage Vcomp which is determined in accordance with the feedback voltage Vfb, the comparator circuit 113 outputs an OFF signal Scmp. Specifically, when the level of the oscillator voltage Vramp is lower than the voltage Vcomp, the comparator circuit 113 outputs a low signal Scmp to the OR circuit 114. On the other hand, when the level of the oscillator voltage Vramp is higher than the voltage Vcomp, the comparator circuit 113 outputs a high signal Scmp turning off the MOS transistor 30 to the OR circuit 114.

The OR circuit 114 calculates a logical sum of signals Scmp, Sovp (described later), and Socp (described later) respectively from the comparator circuit 113 and the later-described comparator circuits 42 and 43 and outputs the logical sum as the OFF signal Sreset. Note that, in the present embodiment, the comparator circuit 113 and the OR circuit 114 correspond to a "signal output circuit". Note that, when no comparator circuits 42 and 43 (described later) are provided, only the comparator circuit 113 corresponds to the "signal output circuit".

The comparator circuit 42 is a circuit that determines whether the output voltage Vout is in an overvoltage state. Specifically, when the feedback voltage Vfb is higher than a threshold voltage Vref4, the comparator circuit 42 determines that it is an overvoltage and outputs a high signal Sovp turning off the MOS transistor 30 to the OR circuit 114. On the other hand, when the feedback voltage Vfb is lower than the threshold voltage Vref4, the comparator circuit 42 determines that it is not an overvoltage and outputs a low signal Sovp to the OR circuit 114. Note that, the predetermined level V3 corresponds to a "third level", and the comparator circuit 42 corresponds to a "first control circuit".

The comparator circuit 42 is a circuit that determines whether the inductor current IL is an overcurrent after the MOS transistor 30 is turned on. Additionally, when the inductor current IL exceeds a predetermined value indicating the overcurrent after the MOS transistor 30 is turned on, the comparator circuit 43 causes the OFF signal output circuit 41 to output the OFF signal Sreset.

Specifically, when the voltage Vcs is higher than a threshold voltage Vref5 which is determined in accordance with a predetermined value, the comparator circuit 43 determines that it is an overcurrent and outputs a high signal Socp turning off the MOS transistor 30. On the other hand, when the feedback voltage Vfb is lower than the threshold voltage Vref5, the comparator circuit 43 determines that it is not an overcurrent and outputs a low signal Socp. Note that, the comparator circuit 43 corresponds to a "second control circuit".

The driver circuit 44 drives the MOS transistor 30 based on the ON signal Sset and the OFF signal Sreset.

Specifically, in order to turn on the MOS transistor 30, the driver circuit 44 applies the voltage Vdr turning on the MOS transistor 30 to the terminal OUT. On the other hand, in order to turn off the MOS transistor 30, the driver circuit 44 applies the voltage Vdr turning off the MOS transistor 30 to the terminal OUT. The driver circuit 44 includes an RS flip-flop 120 and a buffer circuit 121.

The RS flip-flop 120 changes a Q-output based on the ON signal Sset and the OFF signal Sreset and outputs the Q-output as a driving signal Vq1. Note that, the RS flip-flop 120 is a flip-flop with priority on reset.

The buffer circuit 121 turns on and off the MOS transistor 30 in accordance with a level of the driving signal Vq1. Specifically, the buffer circuit 121 outputs the voltage Vdr turning on the MOS transistor 30 based on a high signal Vq1. On the other hand, the buffer circuit 121 outputs the voltage Vdr turning off the MOS transistor 30 based on a low signal Vq1.

As a result, the driver circuit 44 changes the voltage Vdr so as to set the output voltage Vout to the target level and also turns off the MOS transistor 30 when an abnormality such as an overcurrent is detected.

==Relationship Between Output Voltage Vout and Predetermined Levels V1, V2, and V3==

Figure 3:
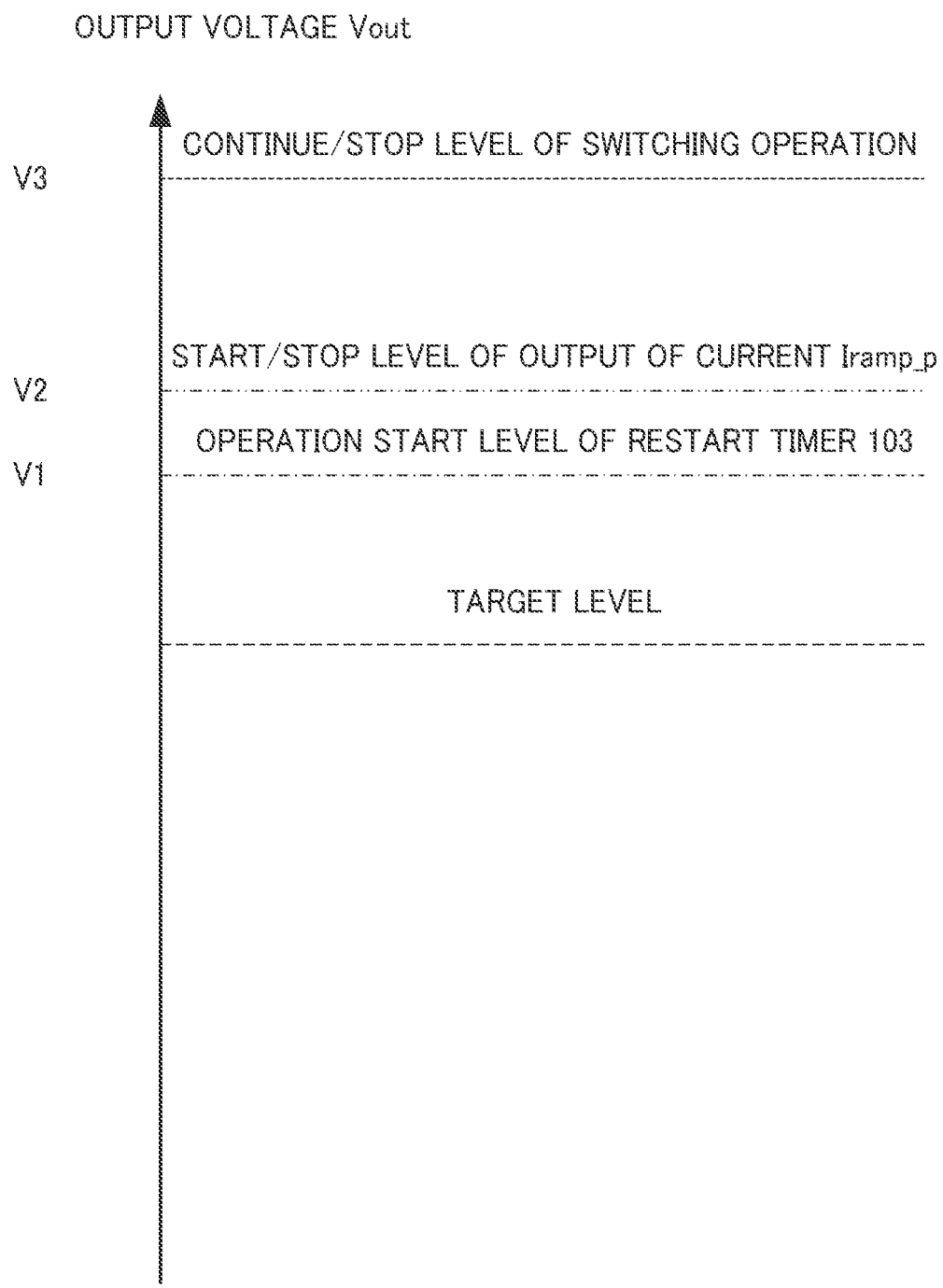
FIG. 3 is a diagram illustrating a relationship between an output voltage Vout and predetermined levels V1, V2, and V3.

FIG. 3 is a diagram illustrating a relationship between the output voltage Vout and the predetermined levels V1, V2, and V3.

In the AC-DC converter 10, the output voltage Vout may rise when the load 12 is transiently in the light load state.

Then, when the output voltage Vout exceeds the target level and reaches the predetermined level V1, the frequency reduction circuit 102 stops outputting the ON signal Sfreq. Additionally, in this case, the restart timer 103 starts to output the ON signal Stim.

Thereafter, when the load 12 further transitions to the light load state, and the output voltage Vout further rises to reach the predetermined level V2, the error amplifier circuit 110 starts to output the current Iramp_p, and the oscillator circuit 111 changes the slope of the oscillator voltage Vramp. Note that, as described above, when the output voltage Vout is lower than the predetermined level V2, the error amplifier circuit 110 stops outputting the current Iramp_p.

Note that, in FIG. 3, the predetermined level V2 is higher than the predetermined level V1; however, the predetermined levels V1 and V2 may be at the same voltage level. The reason why the predetermined level V2 is set higher than the predetermined level V1 is so as to cause the frequency reduction circuit 102 to stop outputting the ON signal Sfreq before the error amplifier circuit 110 starts to output the current Iramp_p.

Therefore, the ON time period of the MOS transistor 30 is shortened only when the restart timer 103 operates, and it is possible to suppress an increase in the switching frequency of the MOS transistor 30 along with the shortening of the ON time period.

Additionally, when the load 12 is, for example, in a no-load state, and the output voltage Vout further rises to exceed the predetermined level V3 indicating the overvoltage of the output voltage Vout, the power factor correction IC 29 stops switching the MOS transistor 30. Note that, the predetermined level V3 is higher than the predetermined levels V1 and V2.

==About Operation Mode of Power Factor Correction IC 29==

FIG. 4 is a diagram describing an operation mode of the power factor correction IC 29. As described above, the power factor correction IC 29 operates in any one of the critical mode, the bottom skip mode, the bottom-non-detection mode, and a fixed frequency mode.

First, when the feedback voltage Vfb is lower than the reference voltage Vref1 which is determined in accordance with the predetermined level V1, the frequency reduction circuit 102 outputs the ON signal Sfreq. Additionally, when the inductor current IL oscillates, and the voltage Vzcd is higher than the threshold Vthh, the power factor correction IC 29 operates in any one of the critical mode and the bottom skip mode.

Moreover, when the load 12 is in the heavy load state, the ON time period of the MOS transistor 30 is long, and the time period T is longer than the time period Ta, the power factor correction IC 29 operates in the critical mode and does not perform a bottom skip operation.

On the other hand, when the load 12 is in the light load state, the ON time period of the MOS transistor 30 is short, and the time period T is shorter than the time period Ta, the power factor correction IC 29 operates in the bottom skip mode and performs the bottom skip operation.

In addition, when the voltage Vzcd is not higher than the threshold Vthh even though the inductor current IL oscillates, the power factor correction IC 29 operates in the bottom-non-detection mode. In this case, the power factor correction IC 29 turns on the MOS transistor 30 after a time period Trst0 has elapsed since the voltage Vzcd becomes lower than the threshold Vthl.

Finally, when the feedback voltage Vfb is higher than the reference voltage Vref1, the restart timer 103 outputs the ON signal Stim and fixes the switching cycle of the MOS transistor 30 (that is, sets to a time period Trst1). In this case, the power factor correction IC 29 operates in the fixed frequency mode.

==Operation of Frequency Reduction Circuit 102==

As described above, when the output voltage Vout is lower than the predetermined level V1, the power factor correction IC 29 operates in any one of the critical mode, the bottom skip mode, and the bottom-non-detection mode based on the function of the frequency reduction circuit 102.

==Critical Mode==

Here, the "critical mode" is a mode in which the frequency reduction circuit 102 in FIG. 2 outputs the ON signal Sfreq turning on the MOS transistor 30 when the voltage Vzcd reaches the voltage Vthl indicating that the inductor current IL is "0" after the MOS transistor 30 is turned off. As a result, in the critical mode, a time period in which the inductor current IL is discontinuous is substantially zero.

Note that, when the load 12 is in the heavy load state, the frequency reduction circuit 102 outputs the ON signal Sfreq turning on the MOS transistor 30 in the critical mode. Details of the critical mode are described below with reference to FIG. 5.

Here, a time t1 at which, after the MOS transistor 30 is turned off, the RS flip-flop 120 in FIG. 2 outputs the high signal Vq1 so as to turn on the MOS transistor 30 is described first. Note that, in FIG. 5, the feedback voltage Vfb is lower than the reference voltage Vref1, and the error amplifier circuit 110 stops outputting the current Iramp_p.

At the time t1, the frequency reduction circuit 102 outputs the pulsed signal Sfreq so as to turn on the MOS transistor 30 in FIG. 1. This causes the RS flip-flop 120 to output the high signal Vq1. Additionally, the buffer circuit 121 raises the voltage Vdr. Once the MOS transistor 30 is turned on, the inductor current IL starts to rise.

Here, since the current flows between the drain and the source of the MOS transistor 30 once the MOS transistor 30 is turned on, the voltage of the main coil L1 of the transformer 25 rises. On the other hand, the voltage of the auxiliary coil L2 having the reverse polarity from the main coil L1 decreases. This causes the voltage Vzcd applied to the terminal ZCD to also decrease to be lower than the threshold voltage Vthl. Accordingly, at the time t1, the comparator circuit 100 changes the level of the signal Szcd to be high.

In addition, the oscillator circuit 111 in FIG. 2 outputs the oscillator voltage Vramp having a voltage level gradually rising from the timing when the MOS transistor 30 is turned on.

At a time t2, the level of the oscillator voltage Vramp outputted by the oscillator circuit 111 becomes higher than the voltage Vcomp applied to the terminal COMP. In this case, the comparator circuit 113 outputs the high signal Scmp.

The RS flip-flop 120 outputs the low signal Vq1 turning off the MOS transistor 30 in accordance with the high signal Scmp. Additionally, the buffer circuit 121 decreases the voltage Vdr.

Accordingly, at the time t2, the MOS transistor 30 is turned off. Since the MOS transistor 30 is turned off, the voltage of the main coil L1 of the transformer 25 decreases, and the voltage Vzcd having the reverse polarity increases.

At a time t3, when the inductor current IL flowing through the main coil L1 becomes small, the inductance of the main coil and the parasitic capacitance of the circuit such as the parasitic capacitance of the MOS transistor 30 resonate, and thus the current flows through the circuit. In this case, the voltage between the two ends of the main coil L1 increases, and the voltage Vzcd is reduced.

At a time t4, the comparator circuit 100 determines that the voltage Vzcd applied to the terminal ZCD is equal to or smaller than the threshold voltage Vthl. Accordingly, it is detected that the inductor current IL flowing through the main coil L1 is 0. According to the detection result, the comparator circuit 100 changes the level of the outputted signal Szcd from low to high.

In the critical mode, when it is detected that the inductor current IL flowing through the main coil is 0, the frequency reduction circuit 102 outputs a high signal Sfreq turning on the MOS transistor 30.

Accordingly, the RS flip-flop 120 outputs the high signal Vq1. Additionally, the buffer circuit 121 raises the voltage Vdr applied to the gate electrode of the MOS transistor 30.

At the time t4, the driver circuit 44 turns on the MOS transistor 30 as with the time t1. After the time t4, a similar operation as that in the time period from the time t1 to the time t4 is repeated. Note that, since the load 12 is in the heavy load state, it is indicated in FIG. 5 that the time period from the time t1 to the time t4 (that is, the time period T) is longer than the time period Ta.

===Bottom Skip Mode===

On the other hand, a case where the power factor correction IC 29 in FIG. 1 operates in the bottom skip mode will be described with reference to FIG. 6. The "bottom skip mode" is a mode in which the power factor correction IC 29 outputs the signal turning on the MOS transistor 30 after waiting for a certain time period when the voltage Vzcd reaches the voltage Vthl indicating that the inductor current IL is 0 after the MOS transistor 30 is turned off.

That is, in the bottom skip mode, the timing to turn on the MOS transistor 30 again after the MOS transistor 30 is turned off and the inductor current IL indicates 0 is after the first timing indicating the lowest value (bottom) obtained by the oscillation of the voltage Vzcd has elapsed.

Figure 5:
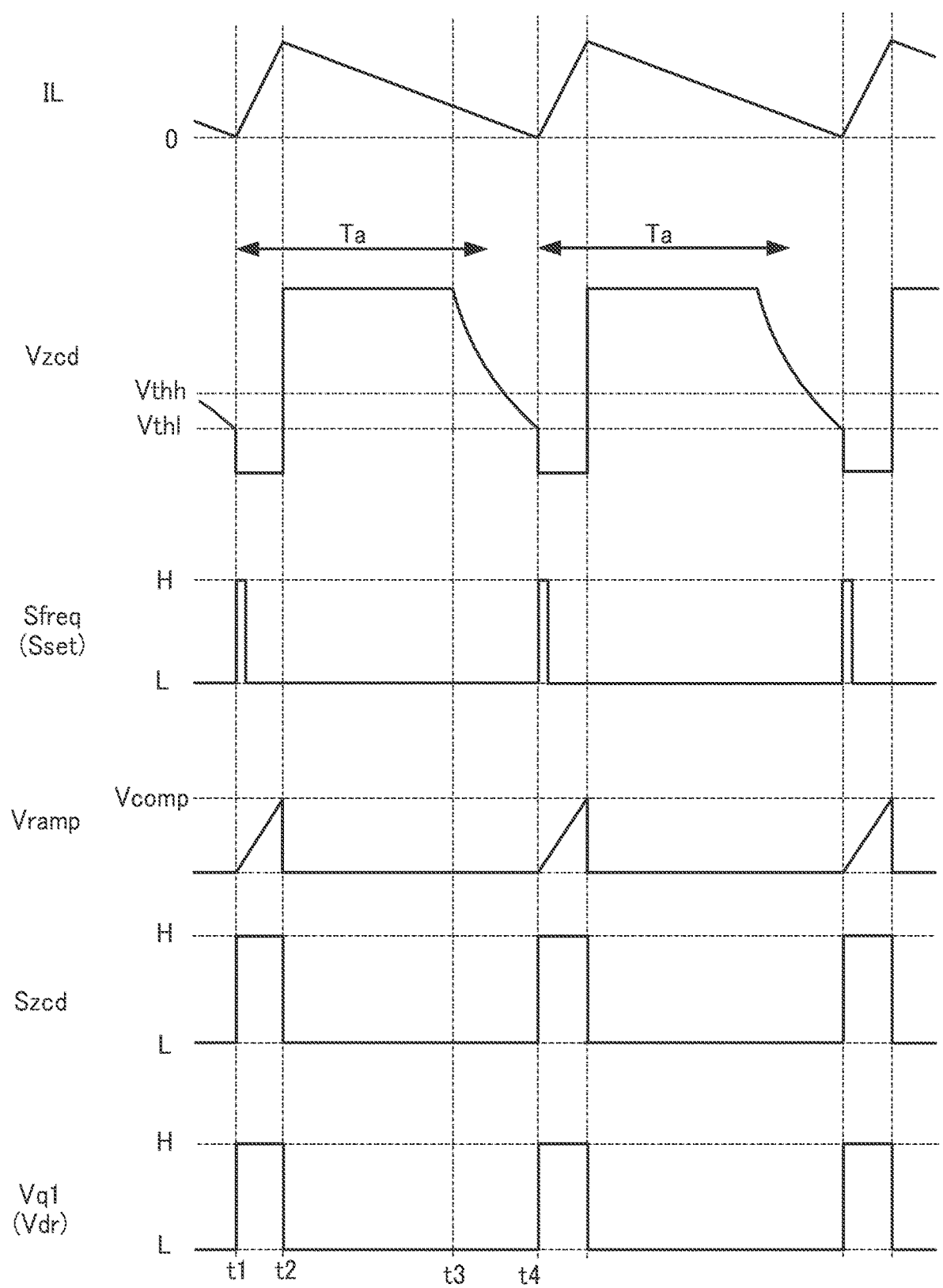
FIG. 5 is a diagram illustrating an example of an operation of a frequency reduction circuit 102.
Figure 6:
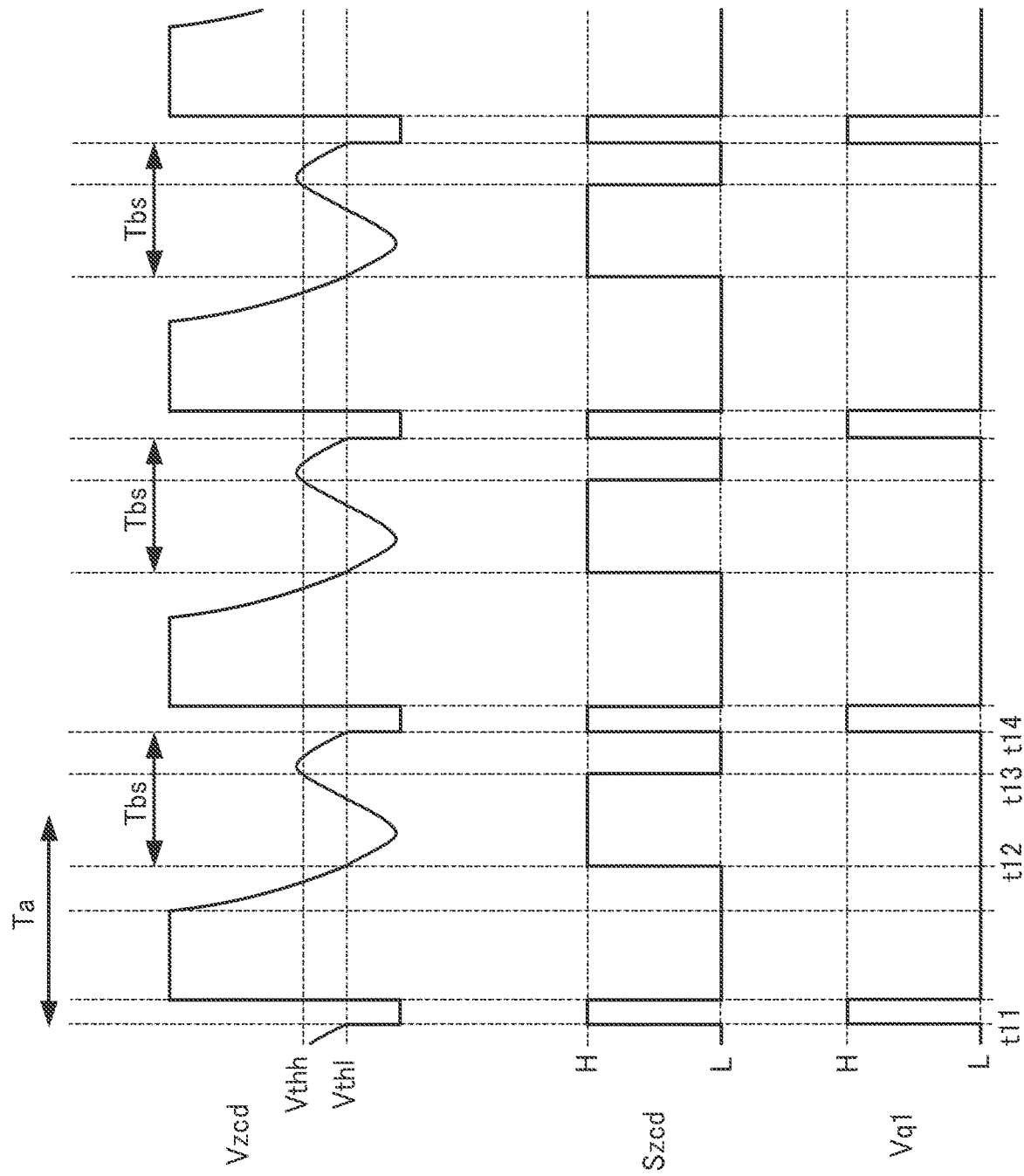
FIG. 6 is a diagram illustrating an example of an operation of a frequency reduction circuit 102.
Figure 7:
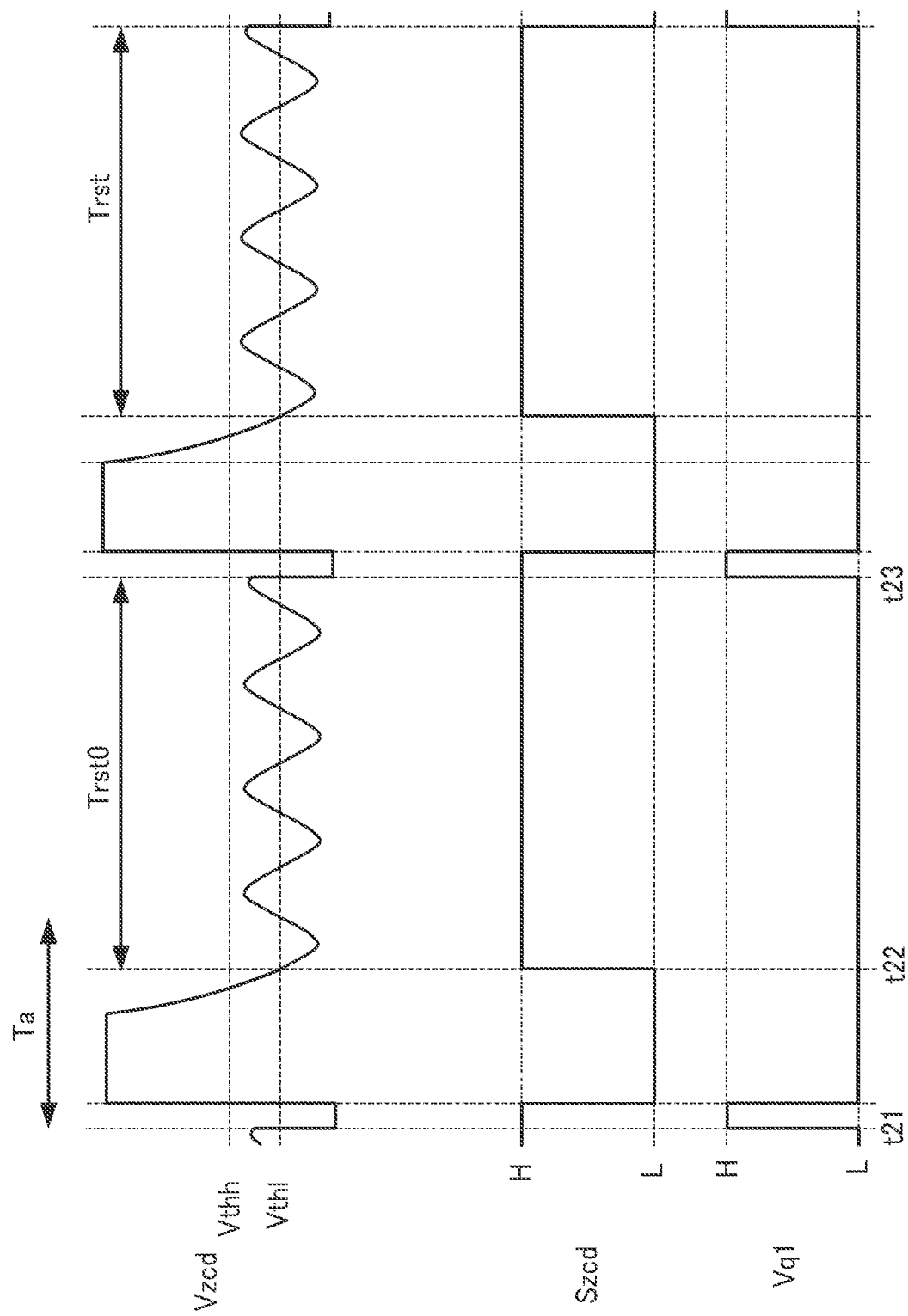
FIG. 7 is a diagram illustrating an example of an operation of a frequency reduction circuit 102.

Note that, the signal Sfreq and the oscillator voltage Vramp are similar to that in FIG. 5; for this reason, illustrations thereof are omitted in the waveform diagrams in FIGS. 6 and 7. Additionally, an operation waveform diagram is intended for description, and FIG. 5 differs from the following diagrams including FIG. 6 in a scale such as a time direction. Moreover, in FIG. 6, the feedback voltage Vfb is lower than the reference voltage Vref1, and the error amplifier circuit 110 stops outputting the current Iramp_p.

When the load 12 is in the light load state, the power factor correction IC 29 operates in the bottom skip mode. That is, this is an operation of the frequency reduction circuit 102 for a case where the time period T is shorter than the time period Ta.

Here, the operation of the frequency reduction circuit 102 from a time t11 at which the MOS transistor 30 is turned on until a time t12 at which the MOS transistor 30 is turned off and the voltage Vzcd indicates the threshold Vthl is common with that in FIG. 5. An operation of the circuit included in the power factor correction IC 29 at and after the time t12 is described below.

At the time t12, the comparator circuit 100 determines whether the voltage Vzcd applied to the terminal ZCD is smaller than the threshold voltage Vthl. Accordingly, it is detected that the inductor current IL flowing through the main coil L1 reaches 0. According to the detection result, the comparator circuit 100 changes the level of the outputted signal Szcd from low to high.

In the bottom skip mode, after the MOS transistor 30 is turned off and the comparator circuit 100 detects that the inductor current IL reaches 0, the frequency reduction circuit 102 outputs the signal Sfreq turning on the MOS transistor 30 after waiting for a predetermined time period Tbs.

After the time t12, the inductor current IL and the voltage Vzcd sinusoidally oscillate after the inductor current IL reaches 0 due to the resonance of the inductance of the transformer 25 and the parasitic capacitance of the circuit such as the MOS transistor 30. Note that, an amplitude of the voltage Vzcd depends on a boost ratio in the boost chopper circuit including the main coil L1, the diode 27, and the capacitor 28. The amplitude of the voltage Vzcd is greater as the boost ratio is greater and is smaller as the boost ratio is smaller.

Here, since the amplitude of the voltage Vzcd is greater than |threshold Vthh−threshold Vthl|, the comparator circuit 100 detects that the voltage Vzcd oscillates after the voltage Vzcd indicates the threshold Vthl and then indicates the threshold Vthh. Once detecting that the voltage Vzcd indicates the threshold Vthh, the comparator circuit 100 changes the level of the outputted signal Szcd to be low.

That is, the comparator circuit 100 outputs a high signal Szcd from the time when the voltage Vzcd falls below the threshold Vthl to the time when the voltage Vzcd exceeds the threshold Vthh. On the other hand, the comparator circuit 100 outputs a low signal Szcd from the time when the voltage Vzcd exceeds the threshold Vthh to the time when the voltage Vzcd falls below the threshold Vthl again.

At a time t13, the comparator circuit 100 changes the outputted signal Szcd to be low in accordance with the voltage Vzcd indicating the threshold Vthh.

After it is detected that the inductor current IL reaches 0, the frequency reduction circuit 102 waits until the number of times that the voltage Vzcd reaches the threshold Vthl after reaching the threshold Vthh by the oscillation of the voltage Vzcd reaches a predetermined number of times.

That is, in the bottom skip mode of the power factor correction IC 29, the predetermined time period Tbs for which the frequency reduction circuit 102 waits after the inductor current IL reaches 0 is based on the number of times that the voltage Vzcd reaches the threshold Vthl after reaching the threshold Vthh. In the example in FIG. 6, an example in which the predetermined number of times is one is illustrated, and the time period from the time t11 to the time t13 corresponds to the time period Tbs. It is possible to set this number of times to a greater number if a further reduction in the switching frequency in a case of the light load is desired.

At a time t14, the frequency reduction circuit 102 outputs the signal Sfreq turning on the MOS transistor 30. This causes the RS flip-flop 120 of the driver circuit 44 to output the high signal Vq1. Additionally, at the time t14, the comparator circuit 100 changes the level of the signal Szcd to be high.

At the time t14, the MOS transistor 30 is turned on. After the time t14, the operations from the time t11 to the time t14 are repeated. Note that, since the load 12 is in the light load state, it is indicated in FIG. 6 that the time period from the time t11 to the time t12 (that is, the time period T) is shorter than the time period Ta.

In the bottom skip mode, the frequency reduction circuit 102 extends the time period from the timing when the MOS transistor 30 is turned on to the timing when the MOS transistor 30 is turned on again after the MOS transistor 30 is turned off. This causes the frequency reduction circuit 102 to reduce the switching frequency, and thus a switching loss is reduced.

===Bottom-Non-Detection Mode===

FIG. 7 is a diagram illustrating an example of an operation of the frequency reduction circuit 102. Note that, in FIG. 7, the feedback voltage Vfb is lower than the reference voltage Vref1, and the error amplifier circuit 110 stops outputting the current Iramp_p. Additionally, in FIG. 7, the power factor correction IC 29 tries to operate in the bottom skip mode as with FIG. 6.

Here, after the MOS transistor 30 is turned off, the amplitude of the inductor current IL and the voltage Vzcd is greater as the boost ratio in the boost chopper circuit is greater and is smaller as the boost ratio is smaller. In FIG. 7, a case where the boost ratio is small and the amplitude of the voltage Vzcd is small is described.

When the power factor correction IC 29 operates in the bottom skip mode, if the high signal Szcd is continuously outputted for a time period longer than the time period Trst0, the frequency reduction circuit 102 outputs the signal Sfreq turning on the MOS transistor 30. This causes the RS flip-flop 120 to output the driving signal Vq1 turning on the MOS transistor 30.

Here, the operation of the frequency reduction circuit 102 from a time t21 at which the MOS transistor 30 is turned on until a time t22 at which the MOS transistor 30 is turned off and the voltage Vzcd indicates the threshold Vthl is common with that in FIG. 4. An operation of the circuit included in the power factor correction IC 29 at and after the time t22 is described below.

At the time t22, the comparator circuit 100 determines that the voltage Vzcd applied to the terminal ZCD is smaller than the threshold voltage Vthl. Accordingly, it is detected that the inductor current IL flowing through the main coil L1 reaches 0. According to the detection result, the comparator circuit 100 changes the level of the outputted signal Szcd from low to high.

After the inductor current IL reaches 0, the voltage Vzcd sinusoidally oscillates. However, when the boost ratio of the boost chopper circuit is small, the amplitude of the voltage Vzcd is smaller than |threshold Vthh−threshold Vthl|.

For example, the boost ratio of the boost chopper circuit is small in a range in which a phase angle of the input current Iin into the full-wave rectifier circuit 23 is a high phase angle. Accordingly, the amplitude of the oscillation of the voltage Vzcd may fall below |threshold Vthh−threshold Vthl| in the range in which the phase angle of the input current Iin is the high phase angle.

Note that, the phase angle of the input current Iin and the AC voltage Vac is the "high phase angle" means that the angle is within, for example, a range of 90±10+180n degrees, that is, a range of (80 to 100)+180n degrees. On the other hand, a "low phase angle" means that the angle is within, for example, a range of 0±10+180n degrees, that is, a range of (−10 to +10)+180n degrees. Here, n is an integer.

In a case of the bottom skip mode similar to that in FIG. 6, the frequency reduction circuit 102 waits until the number of times that the voltage Vzcd reaches the threshold Vthl after reaching the threshold Vthh by the oscillation of the voltage Vzcd after it is detected that the inductor current IL reaches 0 reaches the predetermined number of times.

However, when the amplitude of the oscillation of the voltage Vzcd falls below |threshold Vthh−threshold Vthl|, the voltage Vzcd may not exceed the threshold Vthh no matter how much time has elapsed since the time t22. In this case, if the frequency reduction circuit 102 tries to operate in the bottom skip mode, the signal Sfreq turning on the MOS transistor 30 cannot be outputted no matter how much time has elapsed since the time t22. Additionally, the comparator circuit 100 continues to output the high signal after the time t22.

To deal with this, the frequency reduction circuit 102 times a time period from when the comparator circuit 100 starts to output the high signal Szcd. When the comparator circuit 100 continues to output the high signal Szcd during the time period Trst0, the frequency reduction circuit 102 outputs the signal Sfreq turning on the MOS transistor 30.

Specifically, the frequency reduction circuit 102 times a time period after the inductor current IL reaches 0 based on the signal Szcd. The frequency reduction circuit 102 then outputs the signal Sfreq turning on the MOS transistor 30 when the high signal Szcd is continuously outputted beyond the time period Trst0 (for example, 10 to 20 μs).

That is, at a time t23 at which the time period Trst0 has elapsed since the time t22, the frequency reduction circuit 102 outputs the signal Sfreq turning on the MOS transistor 30. At the time t23, this causes the RS flip-flop 120 to output a high driving signal Vq1, and the MOS transistor 30 is turned on.

After the time t23, the operations from the time t21 to the time t23 are repeated. Note that, since the load 12 is in the light load state as with FIG. 6, it is indicated in FIG. 7 that the time period from the time t21 to the time t22 (that is, the time period T) is shorter than the time period Ta.

===Relationship Between Operation of Frequency Reduction Circuit 102 and Load 12===

Here, when the load 12 is in the light load state, the electric power consumed by the load 12 decreases. In this case, the electric power transmitted from the full-wave rectifier circuit 23 to the load 12 through the transformer 25 and the boost chopper circuit decreases. Accordingly, the inductor current IL flowing through the main coil L1 in the transformer 25 is also reduced.

That is, since the peak of the inductor current IL is low when the load 12 is in the light load state, the time period from the timing when the MOS transistor 30 is turned on until the inductor current IL reaches 0 after the MOS transistor 30 is turned off is short. Accordingly, when the load 12 is in the light load state, the switching frequency of the MOS transistor 30 increases.

On the other hand, when the load 12 is in the heavy load state, the peak of the inductor current IL is high. Accordingly, when the load 12 is in the heavy load state, the time period from the timing when the MOS transistor 30 is turned on to the timing when the inductor current IL reaches 0 after the MOS transistor 30 is turned OFF is long. The frequency reduction circuit 102 determines a state of the load 12 by detecting this time period.

As a result, the frequency reduction circuit 102 compares the time period T with the time period Ta. When the time period Ta is longer than the time period T, the frequency reduction circuit 102 determines that the load 12 is in the light load state, and when the time period Ta is shorter than the time period T, the frequency reduction circuit 102 determines that the load 12 is in the heavy load state.

==Operation of Restart Timer 103 in Fixed Frequency Mode==

Figure 8:
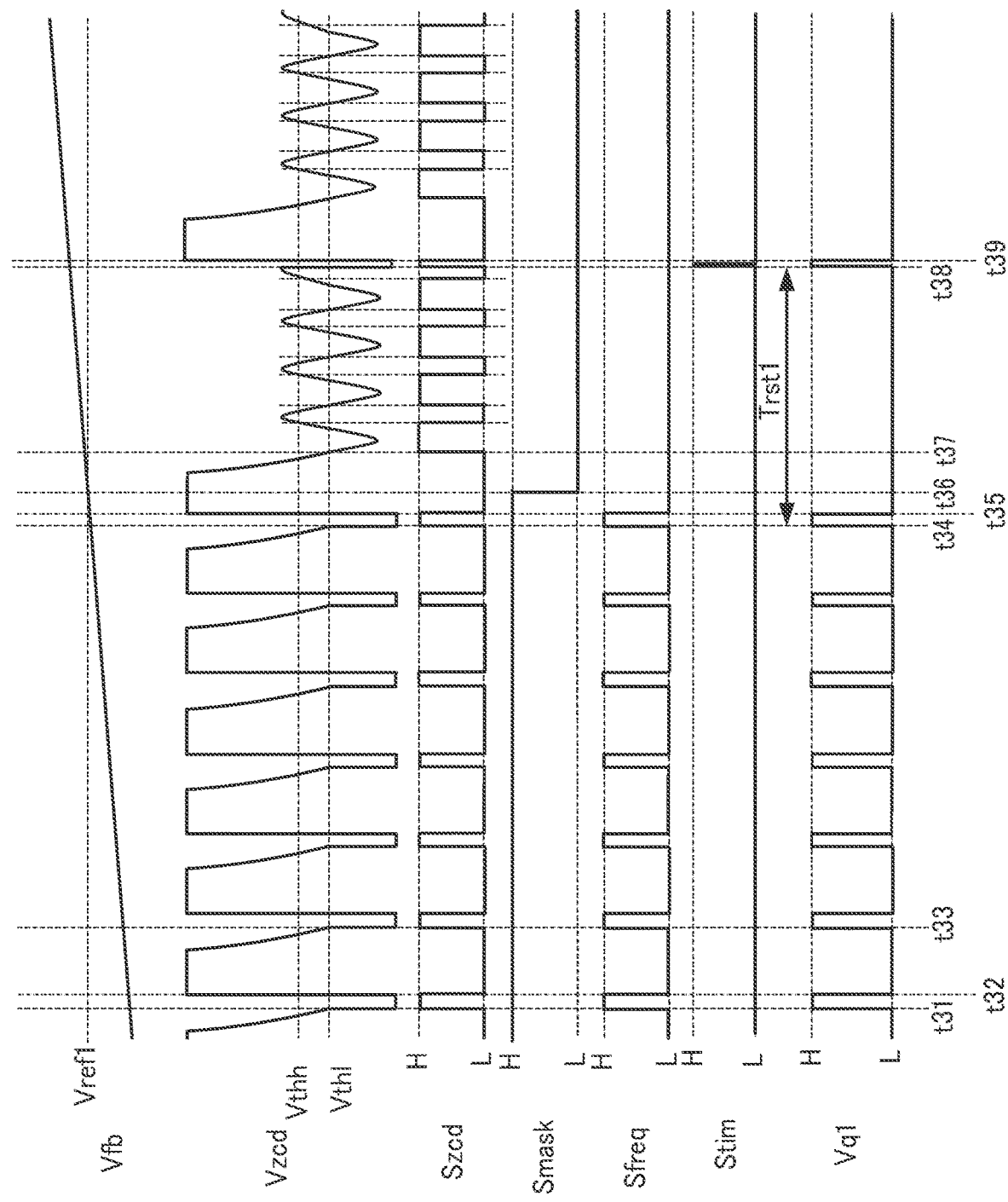
FIG. 8 is a diagram illustrating an example of an operation of a restart timer 103.

FIG. 8 is a diagram illustrating an example of an operation of the restart timer 103. Note that, the oscillator voltage Vramp is similar to that in FIG. 5; for this reason, illustration thereof is omitted in the waveform diagram in FIG. 8.

Additionally, operations from a time t31 to a time t33 are the same as the operations from the time t1 to the time t4; for this reason, description is omitted. The operations from the time t31 to the time t33 are repeated until the time t33 to a time t35; for this reason, description is omitted. Moreover, although the reference voltage Vref2 of the error amplifier circuit 110 in FIG. 2 is equal or greater than the reference voltage Vref1 of the comparator circuit 101, the reference voltage Vref2 in FIG. 8 is equal to the reference voltage Vref1.

At a time t36 at which the feedback voltage Vfb exceeds the reference voltage Vref1, the comparator circuit 101 changes a logic level of the signal Smask from high to low. When the comparator circuit 101 outputs the low signal Smask, the frequency reduction circuit 102 stops outputting the ON signal Sfreq.

At a time t37 at which the inductor current IL reaches "0" after the MOS transistor 30 is turned off at the time t35, the comparator circuit 100 outputs the high signal Szcd. However, since the comparator circuit 101 outputs the low signal Smask, the frequency reduction circuit 102 does not output the high signal Sfreq.

At a time t38 at which the time period Trst1 has elapsed since the high driving signal Vq1 is outputted last, the restart timer 103 outputs the ON signal Stim. As a result, the RS flip-flop 120 outputs the high driving signal Vq1. Accordingly, the MOS transistor 30 is turned on.

At a time t39 at which the comparator circuit 113 determines that the oscillator voltage Vramp exceeds the voltage Vcomp, the MOS transistor 30 is turned off. Additionally, at the time t36, the feedback voltage Vfb is higher than the reference voltage Vref2. Accordingly, the error amplifier circuit 110 outputs the current Iramp_p. Therefore, the ON time period of the MOS transistor 30 from the time t38 to the time t39 is shorter than the ON time period of the MOS transistor 30 from the time t31 to the time t32. Thereafter, when the feedback voltage Vfb is higher than the reference voltage Vref1, the MOS transistor 30 is turned on every time the time period Trst1 has elapsed since the driving signal Vq1 becomes high.

Additionally, in order to suppress heating of the MOS transistor 30, the time period Trst1 is set to be longer than the cycle of the ON signal Sfreq outputted by the frequency reduction circuit 102 based on the inductor current IL at a time when the output voltage Vout is lower than the predetermined level V1.

==Summary==

The AC-DC converter 10 of the present embodiment has been described above. The power factor correction IC 29 includes the ON signal output circuit 40, the OFF signal output circuit 41, and the driver circuit 44. The cycle Trst1 is longer than the cycle of the ON signal Sfreq outputted based on the inductor current IL at a time when the output voltage Vout is lower than the predetermined level V1. Thus, in the power factor correction IC 29, even when the load 12 is transiently in the light load state, and the ON time period of the MOS transistor 30 is short, the switching frequency of the MOS transistor 30 is not increased. Therefore, it is possible to provide a switching control circuit and a power supply circuit that can suppress heating of the switching device.

Additionally, the ON signal output circuit 40 includes the comparator circuit 100, the comparator circuit 101, the frequency reduction circuit 102, and the restart timer 103. Thus, when the output voltage Vout is lower than the predetermined level V1, the frequency reduction circuit 102 outputs the ON signal Sfreq based on the inductor current IL. On the other hand, when the output voltage Vout is higher than the predetermined level V1, the restart timer 103 outputs the ON signal Stim at the cycle Trst1. Therefore, even when the load 12 is transiently in the light load state, the power factor correction IC 29 can prevent an increase in the switching frequency of the MOS transistor 30 and can suppress heating of the MOS transistor 30.

Moreover, the OFF signal output circuit 41 outputs the OFF signal Sreset based on the feedback voltage Vfb so as to shorten the ON time period of the MOS transistor 30 when the output voltage Vout is higher than the predetermined level V2 equal to or higher than the predetermined level V1. Therefore, when the output voltage Vout is transiently high, the power factor correction IC 29 can shorten the ON time period of the MOS transistor 30 and can switch the MOS transistor 30 so as to decrease the output voltage Vout.

Furthermore, the OFF signal output circuit 41 includes the oscillator circuit 111, the comparator circuit 113 and the OR circuit 114, and the error amplifier circuit 110. Therefore, the power factor correction IC 29 can change the slope of the oscillator voltage Vramp outputted by the oscillator circuit 111 so as to shorten the ON time period of the MOS transistor 30 when the output voltage Vout is higher than the predetermined level V2. Accordingly, the power factor correction IC 29 can bring the output voltage Vout close to the target level.

Additionally, when the time period T is longer than the time period Ta, the frequency reduction circuit 102 outputs the ON signal Sfreq once the inductor current IL reaches "0", and when the time period T is shorter than the time period Ta, the frequency reduction circuit 102 outputs the ON signal Sfreq after the number of times that the inductor current IL indicates "0" reaches the predetermined number of times. Therefore, it is possible to maintain the output voltage Vout at the target level load 12 even when the load 12 is constantly in either of the heavy load state and the light load state.

Moreover, the power factor correction IC 29 further includes the comparator circuit 42. Therefore, the power factor correction IC 29 can suppress the output voltage Vout from becoming an overvoltage.

Furthermore, the power factor correction IC 29 further includes the comparator circuit 43. Therefore, the power factor correction IC 29 can suppress the inductor current IL flowing through the MOS transistor 30 from becoming an overcurrent and breaking the MOS transistor 30.

The present disclosure provides a switching control circuit and a power supply circuit that can suppress heating of the switching device.

It is possible to provide a switching control circuit and a power supply circuit that can suppress heating of the switching device.

Hereinabove, embodiments of the present disclosure have been described above, however, technical scope thereof is not limited to the scope of the description of the above embodiments. It is apparent for those skilled in the art that the above embodiments may variously be changed or altered. It is also apparent from the description of the scope of the claims that the technical scope of the present disclosure may include embodiments changed or altered as such without departing from its essential features and equivalents thereof.

It should be noted that processes such as operations, procedures, steps, stages, and the like in a device, a system, a program, and a method described in the claims, the specification, and the drawings may be performed in any order, unless a term such as "before", "prior to" or the like is explicitly used as an output of a previous process is used in a subsequent process. Even if terms such as "first", "next", and/or the like is used, for convenience, with respect to an operation flow in the claims, the specification, and the drawings, this does not mean that the flow needs to be performed in that order.

What is claimed is:

1. A switching control circuit for a power supply circuit that includes
an inductor to which a voltage in accordance with an alternating current (AC) voltage is applied, and
a transistor controlling an inductor current flowing through the inductor,
the power supply circuit generating an output voltage from the AC voltage, the switching control circuit being configured to control switching of the transistor, the switching control circuit comprising:
an ON signal output circuit that
outputs an ON signal to turn on the transistor in response to the inductor current reaches a predetermined current, when a feedback voltage in accordance with the output voltage indicates that the output voltage is lower than a first level, and outputs the ON signal every first cycle when the feedback voltage indicates that the output voltage is higher than the first level;
an OFF signal output circuit that outputs an OFF signal to turn off the transistor based on the feedback voltage; and
a driver circuit that drives the transistor based on the ON signal and the OFF signal, wherein
the first cycle is longer than a second cycle, which is a cycle of the ON signal when the output voltage is lower than the first level.

2. The switching control circuit according to claim 1, wherein the ON signal output circuit includes
a first detection circuit that detects whether the inductor current reaches the predetermined current,
a second detection circuit that detects whether the output voltage is higher than the first level based on the feedback voltage,
a first output circuit that outputs a first ON signal as the ON signal based on a detection result of the first detection circuit when the output voltage is lower than the first level, and
a second output circuit that outputs a second ON signal as the ON signal once the first cycle elapses since the outputting of the ON signal when the output voltage is higher than the first level.

3. The switching control circuit according to claim 2, wherein
the OFF signal output circuit outputs the OFF signal to thereby shorten an ON time period of the transistor when the output voltage is higher than a second level that is equal to or greater than the first level.

4. The switching control circuit according to claim 3, wherein the OFF signal output circuit includes
an oscillator circuit that outputs an oscillator voltage having a voltage level that changes by a predetermined slope when the transistor is turned on,
a signal output circuit that outputs the OFF signal when the oscillator voltage reaches a voltage that is in accordance with the feedback voltage, and
an adjustment circuit that adjusts the predetermined slope to thereby shorten the ON time period of the transistor when the output voltage is higher than the second level.

5. The switching control circuit according to claim 4, wherein
the first output circuit
outputs the first ON signal once the inductor current reaches the predetermined current when a time period, from when the transistor is turned on to when the inductor current reaches the predetermined current after the transistor is turned off, is longer than a predetermined time period, and
outputs the first ON signal after a number of times that the inductor current reaches the predetermined current reaches a predetermined number of times when said time period is shorter than the predetermined time period.

6. The switching control circuit according to claim 3, further comprising:
a first control circuit that causes the OFF signal output circuit to output the OFF signal when the output voltage exceeds a third level that is higher than the second level.

7. The switching control circuit according to claim 6, further comprising:
a second control circuit that causes the OFF signal output circuit to output the OFF signal when the inductor current exceeds a predetermined value after the transistor is turned on.

8. A power supply circuit that generates an output voltage from an alternating current (AC) voltage, the power supply circuit comprising:
an inductor to which a voltage in accordance with the AC voltage is applied;
a transistor that controls an inductor current flowing through the inductor; and
a switching control circuit that controls switching of the transistor, wherein
the switching control circuit includes
an ON signal output circuit that outputs an ON signal to turn on the transistor in response to the inductor current being greater than a predetermined current when a feedback voltage in accordance with the output voltage indicates that the output voltage is lower than a first level, and
outputs the ON signal every first cycle when the feedback voltage indicates that the output voltage is higher than the first level;
an OFF signal output circuit that outputs an OFF signal to turn off the transistor based on the feedback voltage; and
a driver circuit that drives the transistor based on the ON signal and the OFF signal, wherein
the first cycle is longer than a second cycle, which is a cycle of the ON signal when the output voltage is lower than the first level.

* * * * *